United States Patent
Ishii et al.

(10) Patent No.: US 7,653,078 B2
(45) Date of Patent: Jan. 26, 2010

(54) PACKET TRANSMISSION CONTROL APPARATUS AND PACKET TRANSMISSION CONTROL METHOD SCHEDULING PACKETS IN ACCORDANCE WITH CAPABILITIES OF MOBILE STATIONS

(75) Inventors: Hiroyuki Ishii, Yokosuka (JP); Yoshimasa Imamura, Yokohama (JP); Takehiro Nakamura, Yokosuka (JP)

(73) Assignee: NTT DoCoMo, Inc., Tokyo (JP)

(*) Notice: Subject to any disclaimer, the term of this patent is extended or adjusted under 35 U.S.C. 154(b) by 643 days.

(21) Appl. No.: 11/063,846

(22) Filed: Feb. 23, 2005

(65) Prior Publication Data
US 2005/0259661 A1 Nov. 24, 2005

(30) Foreign Application Priority Data
Feb. 23, 2004 (JP) .............................. 2004-046931

(51) Int. Cl.
*H04L 12/28* (2006.01)
*H04J 3/16* (2006.01)
(52) U.S. Cl. ..................................... 370/412; 370/468
(58) Field of Classification Search .................. None
See application file for complete search history.

(56) References Cited

U.S. PATENT DOCUMENTS

| 6,993,006 | B2* | 1/2006 | Pankaj ........................ 370/342 |
| 7,460,474 | B2* | 12/2008 | Ishii et al. .................... 370/230 |
| 7,542,722 | B2* | 6/2009 | Carlsson ...................... 455/63.1 |
| 2002/0105937 | A1* | 8/2002 | Takeuchi et al. ............. 370/345 |
| 2003/0026235 | A1* | 2/2003 | Vayanos et al. ............. 370/342 |
| 2003/0193906 | A1* | 10/2003 | Andrews et al. ............ 370/329 |
| 2003/0223429 | A1* | 12/2003 | Bi et al. ..................... 370/395.4 |
| 2004/0208160 | A1* | 10/2004 | Petrovic et al. ............. 370/350 |
| 2004/0258070 | A1* | 12/2004 | Arima ...................... 370/395.4 |
| 2005/0141421 | A1* | 6/2005 | Ishii et al. .................... 370/230 |
| 2005/0163111 | A1* | 7/2005 | Ishii et al. .................... 370/360 |
| 2005/0281278 | A1* | 12/2005 | Black et al. ................. 370/412 |
| 2008/0069046 | A1* | 3/2008 | Ishii et al. .................... 370/330 |

FOREIGN PATENT DOCUMENTS

| CN | 1400756 A | 3/2003 |
| EP | 1 389 848 A1 | 2/2004 |
| JP | 3-58646 | 3/1991 |
| JP | 2002-171287 | 6/2002 |
| JP | 2002-369247 | 12/2002 |

(Continued)

OTHER PUBLICATIONS

Troels E. Kolding, "Link and System Performance Aspects of Proportional Fair Scheduling in WCDMA/HSDPA", Vehicular Technology Conference, 2003, vol. 3, XP-010701706, Oct. 6, 2003, pp. 1717-1722.

(Continued)

*Primary Examiner*—Ayaz R Sheikh
*Assistant Examiner*—Timothy J Weidner
(74) *Attorney, Agent, or Firm*—Oblon, Spivak, McClelland, Maier & Neustadt, L.L.P.

(57) ABSTRACT

A packet transmission control apparatus performs transmission control of packets to a plurality of mobile stations. The packet transmission control apparatus includes a scheduler configured to perform scheduling of the packets in accordance with capabilities of the mobile stations.

6 Claims, 10 Drawing Sheets

FOREIGN PATENT DOCUMENTS

| | | |
|---|---|---|
| JP | 2003-229894 | 8/2003 |
| JP | 2003-259437 | 9/2008 |
| WO | WO 03/043273 A1 | 5/2003 |

OTHER PUBLICATIONS

Jack M. Holtzman, "CDMA Forward Link Waterfilling Power Control", VTC2000, pp. 1663-1666.

"3rd Generation Partnership Project: Technical Specification Group Radio Access Network: Physical layer aspects of UTRA High Speed Downlink Packet Access (Release 4) 3GPP TR 25.848 V4.0.0", Technical Report, Mar. 2001, pp. 1-89.

"$3^{rd}$ Generation Partnership Project 2" cdma 2000 High Rate Packet Data Air Interface Specification, 3GPP2 C.S0024 Version 4.0, Oct. 25, 2002, pp. 1-548.

U.S. Appl. No. 11/579,992, filed Nov. 9, 2006, Ishii, et al.

U.S. Appl. No. 10/969,013, filed Oct. 21, 2004, Ishii et al.

U.S. Appl. No. 11/019,443, filed Dec. 23, 2004, Ishii et al.

\* cited by examiner

FIG. 8

| TYPE # | WHEN TO RENEW $\bar{R}_n$ | CALCULATION METHOD OF $r_n$ |
|---|---|---|
| 1 | AT EVERY TTI WITHIN CONNECTING TIME | SIZE OF PACKET WHOSE DELIVERY COULD BE ACKNOWLEDGED |
| 2 | AT EVERY TTI WITHIN CONNECTING TIME | SIZE OF TRANSMITTED PACKET |
| 3 | AT EVERY TTI WITHIN CONNECTING TIME | SAME AS $R_n$ |
| 4 | AT TTI WHERE SCHEDULING-RELATED CALCULATION IS CARRIED OUT | SIZE OF PACKET WHOSE DELIVERY COULD BE ACKNOWLEDGED |
| 5 | AT TTI WHERE SCHEDULING-RELATED CALCULATION IS CARRIED OUT | SIZE OF TRANSMITTED PACKET |

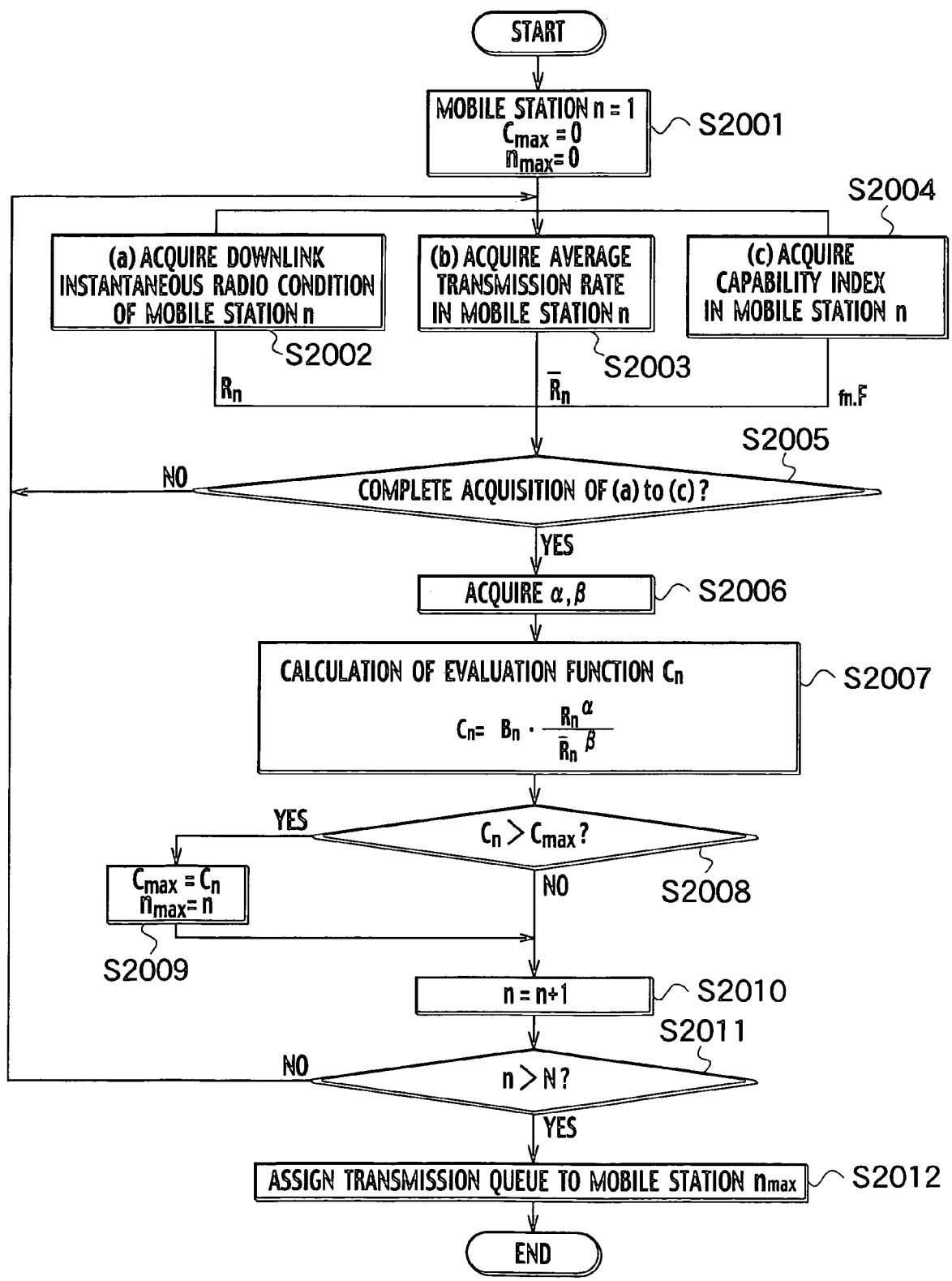

PACKET TRANSMISSION CONTROL APPARATUS AND PACKET TRANSMISSION CONTROL METHOD SCHEDULING PACKETS IN ACCORDANCE WITH CAPABILITIES OF MOBILE STATIONS

CROSS REFERENCE TO RELATED APPLICATION

This application is based upon and claims the benefit of priority from the prior Japanese Patent Application No. P2004-046931, filed on Feb. 23, 2004; the entire contents of which are incorporated herein by reference.

BACKGROUND OF THE INVENTION

1. Field of the Invention

The present invention relates to a packet transmission control apparatus and a packet transmission control method which perform transmission control of packets to a plurality of mobile stations.

The present invention relates particularly to a packet transmission control apparatus and a packet transmission control method which perform transmission control of downlink packets in a mobile communication system.

2. Description of the Related Art

In a downlink of a mobile communication system, one physical channel can be shared among mobile stations which belong to a radio base station. Hereinafter, the physical channel used in such a case is called a "downlink shared channel".

In this downlink shared channel, the radio base station controls the transmission order of packets to the plurality of mobile stations with which the radio base station communicates, in accordance with an instantaneous radio quality between the radio base station and each mobile station, so as to improve throughput that the radio base station can provide, in other words, a system capacity.

This control of packet transmission order by the radio base station is called "scheduling". It is known that, by applying the scheduling to packet transmission, channel capacity increases, or communication condition improves.

Generally, it is considered that the conventional scheduling targets on packets in which requirements for transmission delays are not so strict.

Incidentally, with regard to standardization of the third generation mobile communication system, so-called IMT-2000, there are "3GPP/3GPP2 (Third-Generation Partnership Project/Third-Generation Partnership Project 2)". Standard specifications have been developed as "W-CDMA system" in the 3GPP, and standard specifications have been developed as "cdma2000 system" in the 3GPP2.

In the 3GPP, "HSDPA (High Speed Downlink Packet Access)", which is a high-speed packet transmission system in the downlink direction, has been standardized based upon a prospect that high-speed and high-capacity traffic will increase especially in the downlink due to downloading from databases and websites and the like, as the Internet has rapidly expanded in recent years.

Moreover, in the 3GPP2, "1x-EV DO", which is a transmission system only for high-speed data in the downlink direction, has been standardized from the same viewpoint as above. In the "1x-EV DO" of the cdma2000 system, "DO" means "Date Only".

For example, in the HSDPA, a scheme for controlling a modulation scheme and a coding rate of respective radio channels in accordance with the radio quality between each mobile station and a radio base station (this scheme is called, for example, AMCS (Adaptive Modulation and Coding Scheme) in the HSPDA), and the scheduling which is operated in a cycle of few milliseconds, are used in a combination. Thus, it is possible to improve throughput for individual mobile stations as well as throughput of the entire system.

"Round Robin Scheduler" is widely known as a scheduling algorithm in a radio base station. The "Round Robin Scheduler" controls the transmission order of packets waiting for transmission, by assigning the downlink shared channel sequentially to mobile stations (for example, mobile stations #1 to #2 to #3 . . . ) which belong to the radio base station.

Moreover, "Proportional Fairness Scheduler" and "Max C/I (Maximum C/I) Scheduler" are known as scheduling algorithms in a radio base station. The "Proportional Fairness Scheduler" and the "Max C/I Scheduler" control the transmission order of packets waiting for transmission based upon the instantaneous transmission rate and the average transmission rate of packets to each mobile station.

The "Proportional Fairness Scheduling" is a scheduling algorithm which assigns a transmission queue and also supports fairness amongst the mobile stations, in accordance with instantaneous changes in downlink radio qualities of the individual mobile stations.

Hereinbelow, the "Proportional Fairness Scheduling" is briefly described with reference to FIG. 1. FIG. 1 is a flowchart showing the operation of the "Proportional Fairness Scheduler" mounted on a radio base station.

In the "Proportional Fairness Scheduling", a value of an evaluation function of each mobile station which belongs to the radio base station is calculated based upon the measured instantaneous transmission rate of packets to each mobile station (e.g. the instantaneous radio quality between each mobile station and the radio base station) and the measured average transmission rate of packets to each mobile station (e.g. the average radio quality between each mobile station and the radio base station), and thereafter, a transmission queue is assigned to a mobile station maximizing the value of the evaluation function.

As shown in FIG. 1, in step S1001, the radio base station sets initial values as follows:

n=1 (n: a subscript of a mobile station)

$C_{max}=0$ ($C_{max}$: a maximum value of an evaluation function $C_n$)

$n_{max}=0$ ($n_{max}$: a subscript of the mobile station maximizing the value $C_n$ of the evaluation function)

In step S1002, the radio base station measures elements required in calculating the value $C_n$ of the evaluation function, specifically, an instantaneous transmission rate $R_n$ of packets to each mobile station, and an average transmission rate $\overline{Rn}$ of packets to each mobile station.

In step S1003, the radio base station calculates the value $C_n$ of the evaluation function, by using the values measured in the step S1002, according to the following equation.

$$Cn = \frac{Rn}{\overline{Rn}}$$

In step S1004, the radio base station determines whether or not the value $C_n$ of the evaluation function calculated in the step S1003 exceeds a maximum value $C_{max}$ of the evaluation function.

Here, $C_{max}=0$. Therefore, the determination in the step S1004 is YES, and in step S1005, the radio base station sets the value $C_n$ of the evaluation function calculated in the step S1003 at the maximum value $C_{max}$ of the evaluation function, and also sets "1" at "$n_{max}$".

Thereafter, in step S1006, the radio base station increments "n" by "+1", and determines whether or not "n" exceeds "N (the number of mobile stations communicating with the radio base station)" in step S1007.

Where "n" does not exceed "N", the operation repeats the steps from S1002 to S1006, thus obtaining N values of the evaluation function sequentially.

In step S1008, the radio base station selects a mobile station #$n_{max}$ maximizing the value $C_n$ of the evaluation function, and assigns a transmission queue to the mobile station #$n_{max}$.

Here, the numerator of the evaluation function is an "instantaneous transmission rate of packets to the mobile station (e.g. instantaneous radio quality between the radio station and each mobile station)", and the denominator of the evaluation function is an "average transmission rate of packets to the mobile station (e.g. the average radio quality between the radio station and each mobile station)". Thus, the "Proportional Fairness Scheduler" operates so that the probability of assigning transmission queue to the mobile station #n, whose instantaneous transmission rate is larger than the above average transmission rate, becomes higher.

According to the "Proportional Fairness Scheduler", transmission queues are assigned to a mobile station which has high instantaneous transmission rate, even when the average transmission rate of the mobile station is large or small. Therefore, the "Proportional Fairness scheduler" can realize both "fairness in terms of time" and "high cell throughput by user diversity gain".

However, the operation of the conventional "Proportional Fairness Scheduler" is based on the assumption that the capability is the same in all mobile stations. Thus, there has been a problem in that fairness in terms of time cannot always be provided by the conventional "Proportional Fairness Scheduler" in case where the capability is different in a plurality of mobile stations.

For example, a mobile station has the Receive diversity (Rx diversity) function as a receiver capability and another mobile station dose not have the Receive diversity function as a receiver capability.

In this case, the value $C_n$ of the evaluation function will not always become large in the former mobile station, because the average information rate and the receivable number of information bits (the instantaneous information rate) increase simultaneously, with the Receive diversity function, when the transmission queue is assigned.

Thus, it is adapted to set the same average information rate to all mobile stations because of using $\overline{Rn}$ in the denominator of the evaluation function for the conventional Proportional Fairness Scheduler.

In other words, the conventional Proportional Fairness Scheduler tends to reduce the frequency of assigning transmission queues to a mobile station which has high capability. This causes that the conventional Proportional Fairness Scheduler is adapted to negate the high capability of the former mobile station.

Further, according to the conventional Proportional Fairness Scheduler, typically, the changes of radio quality becomes smaller in a mobile station which has the Receive diversity function than in a mobile station which does not have the Receive diversity function. When the evaluation function is used as an instantaneous radio quality to the average radio quality, the values $C_n$ of the evaluation function becomes larger in little case, or the maximum value of the evaluation function becomes smaller. As a result, there has been a problem in that the number of times transmission queues are assigned is reduced.

It is explained, by referring to FIG. 2, that the radio quality changes of a mobile station having the Receive diversity function becomes smaller. As shown in FIG. 2, the radio qualities which change without correlation are combined by the mobile station which has the Receive diversity function, and therefore the radio quality changes are reduced.

In short, there has been a problem in that the conventional Proportional Fairness Scheduler is adapted to reduce the number of times transmission queues are assigned to mobile stations which have high capabilities, and to negate the effect of the high capabilities.

Further, as those mobile stations have high capability at the risk of high price, large power requirements, or large in size, it is reasonable that the number of times transmission queues are assigned should be increased. However, the conventional Proportional Fairness Scheduler is adapted to act in conflict with this concept.

BRIEF SUMMARY OF THE INVENTION

In viewing of the foregoing, it is an object of the present invention to provide a packet transmission control apparatus and a packet transmission control method which can realize fairness in terms of time according to the capability of mobile stations while operating the conventional "Proportional Fairness Scheduler".

A first aspect of the present invention is summarized as a packet transmission control apparatus which performs transmission control of packets to a plurality of mobile stations. The packet transmission control apparatus includes a scheduler configured to perform scheduling of the packets in accordance with capabilities of the mobile stations.

In the first aspect, the packet transmission control apparatus can further include a capability index setter configured to set capability indexes corresponding to each of the capabilities, and the scheduler can be configured to schedule to transmit the packets to a mobile station which maximizes a value of an evaluation function which is calculated in use of the capability index.

In the first aspect, the packet transmission control apparatus can further include an acquirer configured to acquire instantaneous transmission rates $R_n$ of the packets to the mobile stations #n and average transmission rates of the packets to the mobile stations #n, and the scheduler can be configured to schedule to transmit the packets to a mobile station which maximizes a value $C_n$ of an evaluation function which is calculated according to an equation by using the capability indexes $B_n$ corresponding to capabilities of the mobile stations #n, instantaneous transmission rates $R_n$ of the packets to the mobile stations #n, the average transmission rates of the packets to the mobile stations #n and predetermined parameters $\alpha$ and $\beta$.

In the first aspect, the scheduler can be configured to manage priority classes of packet transmission to the mobile stations, and to perform scheduling of the packets to the mobile stations in accordance with priority classes.

In the first aspect, the packet transmission control apparatus can further include an acquirer configured to acquire instantaneous transmission rates $R_n$ of the packets to the mobile stations #n and average transmission rates of the packets to the mobile stations #n, and the scheduler can be configured to schedule to transmit the packets to a mobile station which maximizes a value $C_n$ of an evaluation function which is calculated according to an equation by using weighting factors $A_{PCn}$ according to the priority classes $PC_n$ of the mobile stations #n, the capability indexes $B_n$ corresponding to the capabilities of the mobile stations #n, instantaneous transmission rates $R_n$ of the packets to the mobile stations #n, average transmission rates of the packets to the mobile stations #n and predetermined parameters $-\alpha_{PCn}$ and $\beta_{PCn}$ for each of the priority classes $PC_n$.

In the first aspect, the capability index setter can be configured to set the capability indexes corresponding to the capabilities of the mobile stations in accordance with an external instruction.

In the first aspect, the capability of the mobile station can be defined by at least one of whether or not the mobile station has a Receive diversity function, whether or not the mobile station can perform a transmission diversity, whether or not the mobile station has an advanced receiver function, a maximum size of data which the mobile station can receive, a modulation scheme of data which the mobile station can receive, a maximum number of codes used for data which the mobile station can receive, and a minimum interval to be ready for receiving a packet after a packet is received at the mobile station.

A second aspect of the present invention is summarized as a packet transmission control method for performing transmission control to packets to a plurality of mobile stations. The method includes: setting capability indexes $B_n$ corresponding to the mobile stations #n; acquiring instantaneous transmission rates $R_n$ of the packets to the mobile stations #n and average transmission rates of the packets to the mobile stations #n; calculating values $C_n$ of evaluation functions according to an equation by using the capability indexes $B_n$ corresponding to the capabilities of the mobile stations #n, the instantaneous transmission rates $R_n$ of the packets to the mobile stations #n, the average transmission rates of and predetermined parameters $\alpha$ and $\beta$; and scheduling the packets to transmit to a mobile station #n which maximizes a value $C_n$ of the calculated evaluation function.

BRIEF DESCRIPTION OF THE SEVERAL VIEWS OF THE DRAWINGS

FIG. 8 is a view for explaining an operation of a mobile station transmission rate calculating unit of the MAC-hs processing unit within the base band signal processing unit in the radio base station according to the first embodiment of the present invention.

FIG. 9 is a flowchart showing an operation of the MAC-hs processing unit within the base band signal processing unit in the radio base station according to the first embodiment of the present invention.

DETAILED DESCRIPTION OF THE INVENTION

A First Embodiment of the Present Invention

<Configuration of Packet Transmission Control Apparatus According to the First Embodiment of the Present Invention>

The configuration of a packet transmission control apparatus according to a first embodiment of the present invention is described below, with reference to the drawings.

Figure 1:
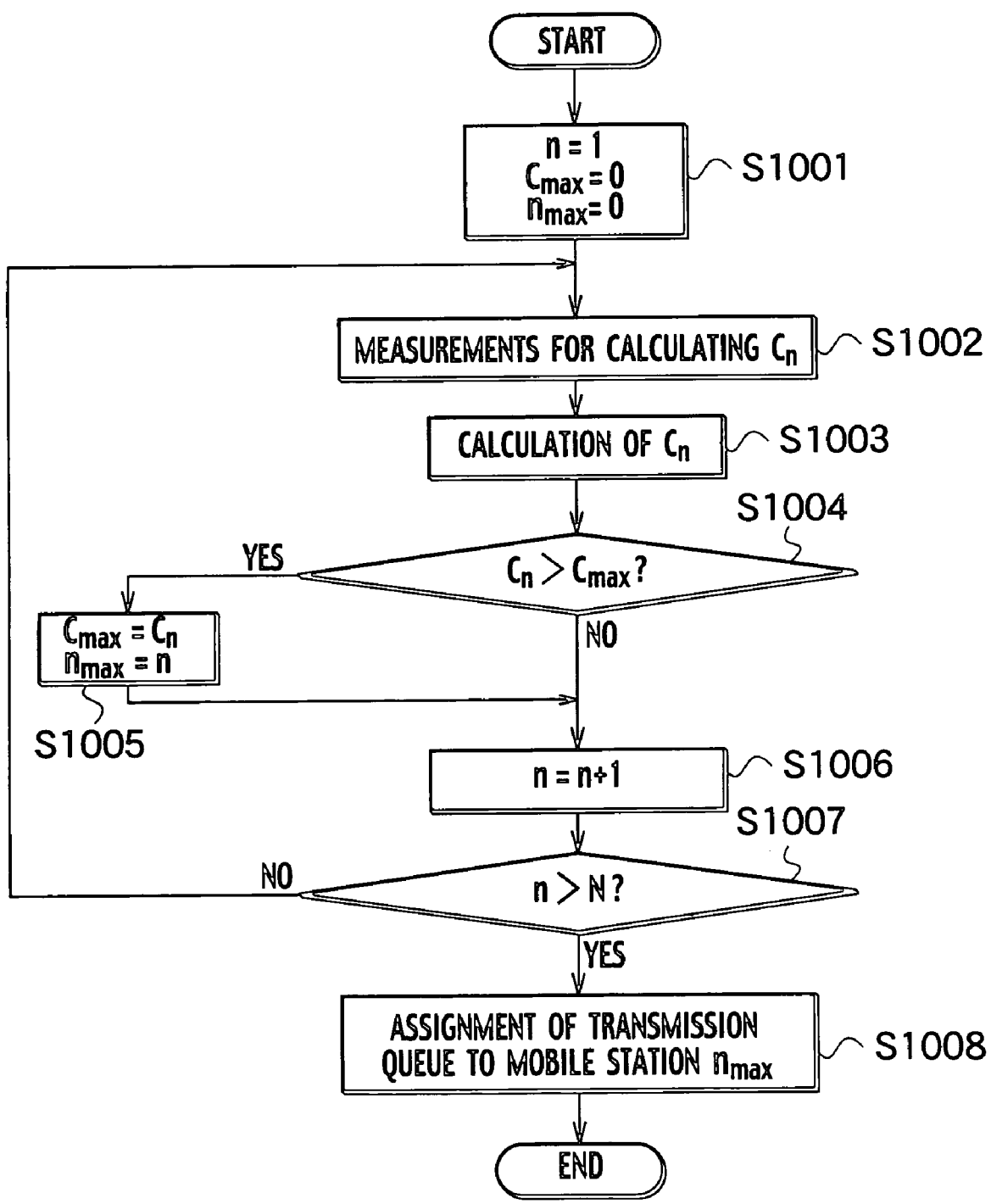
FIG. 1 is a flowchart showing an operation of an MAC-hs processing unit within a base band signal processing unit in a radio base station according to a prior art.
Figure 2:
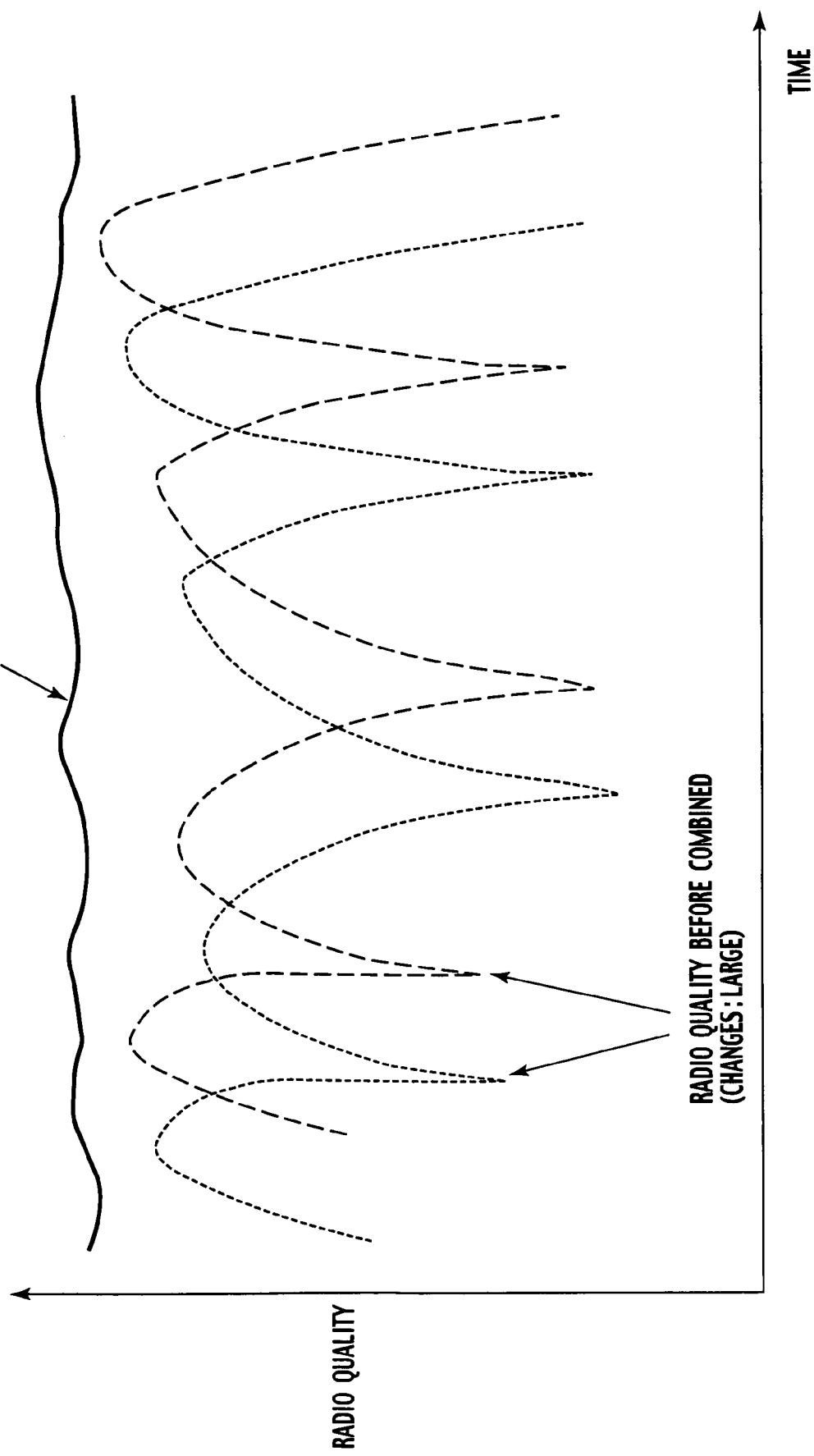
FIG. 2 is a view for explaining reduction in changes of a radio quality of a mobile station which uses a Receive diversity process in a scheduler according to the prior art.
Figure 3:
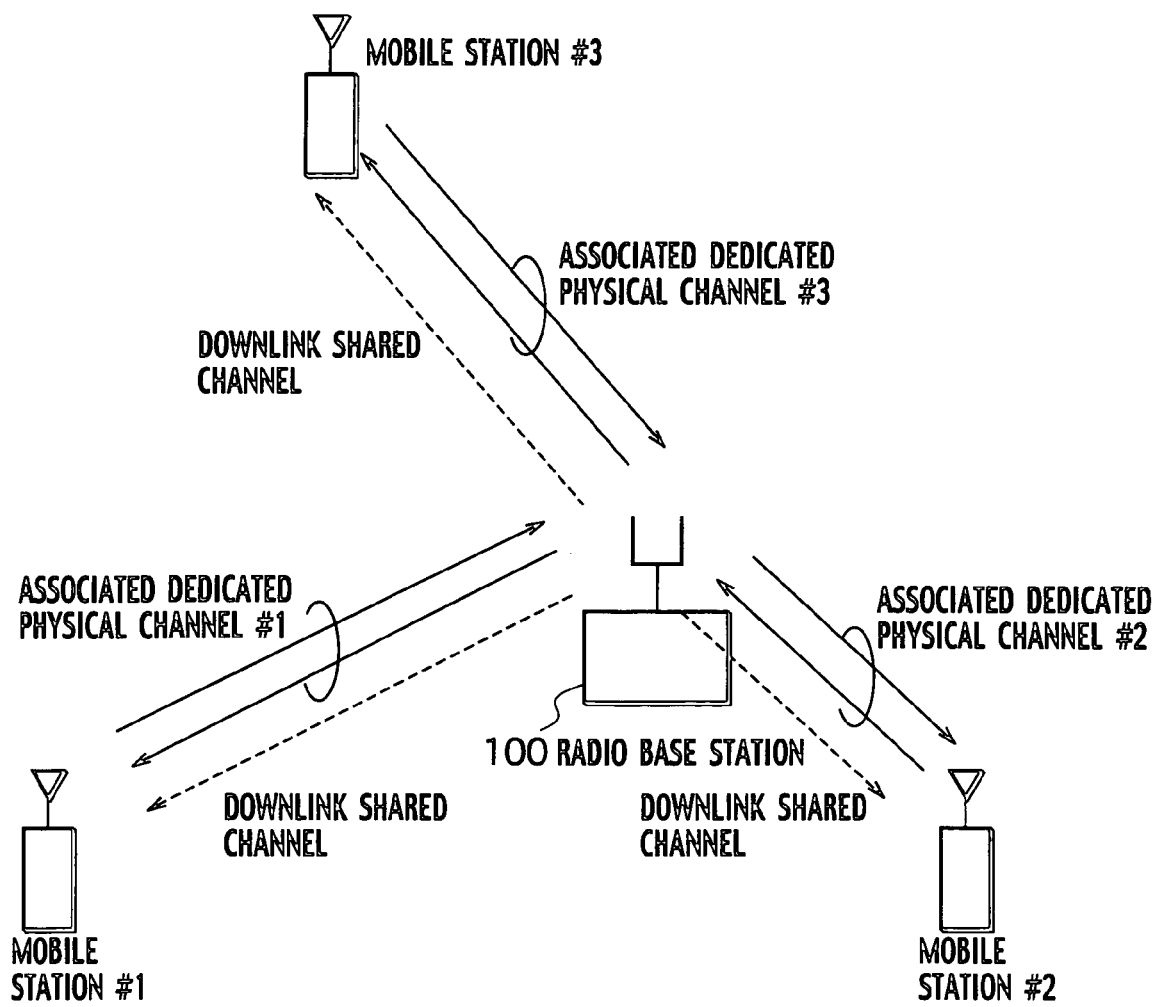
FIG. 3 is a view of the entire configuration of a mobile communication system according to a first embodiment of the present invention.

FIG. 3 is a view showing an example of the configuration of a mobile communication system in which the packet transmission control apparatus is provided according to the first embodiment of the present invention is provided.

In FIG. 3, this mobile communication system is configured with a radio base station 100 and a plurality of mobile stations #1 to #3, and employs the "HSDPA". In the first embodiment, description is given regarding an example where the above-described packet transmission control apparatus is provided in the radio base station 100.

In downlink packet transmission in the "HSDPA", used are a downlink shared channel (DSCH) or a high speed-DSCH (HS-DSCH), and associated dedicated physical channels #1 to #3 (bidirectional channels in uplink and downlink directions) associated with a physical channel (DSCH or HS-DSCH). Each of the associated dedicated physical channels #1 to #3 is assigned to the individual mobile stations #1 to #3, respectively.

In the uplink directions of the associated dedicated physical channels #1 to #3, transmitted are not only user data, but also pilot symbols, transmission power control commands (TPC commands) for transmission of downlink associated dedicated physical channels, downlink radio quality information used for scheduling of the shared channel and AMCS (Adaptive Modulation and Coding Scheme), and the like.

On the other hand, in the downlink directions of the associated dedicated physical channels #1 to #3, transmission power control commands (TPC commands) for transmission of the uplink associated dedicated physical channels and the like are transmitted.

In the first embodiment, the respective mobile stations #1 to #3 have the same configuration and function. Therefore, they are described as the mobile station #n ($n \geq 1$) unless otherwise specified.

Figure 4:
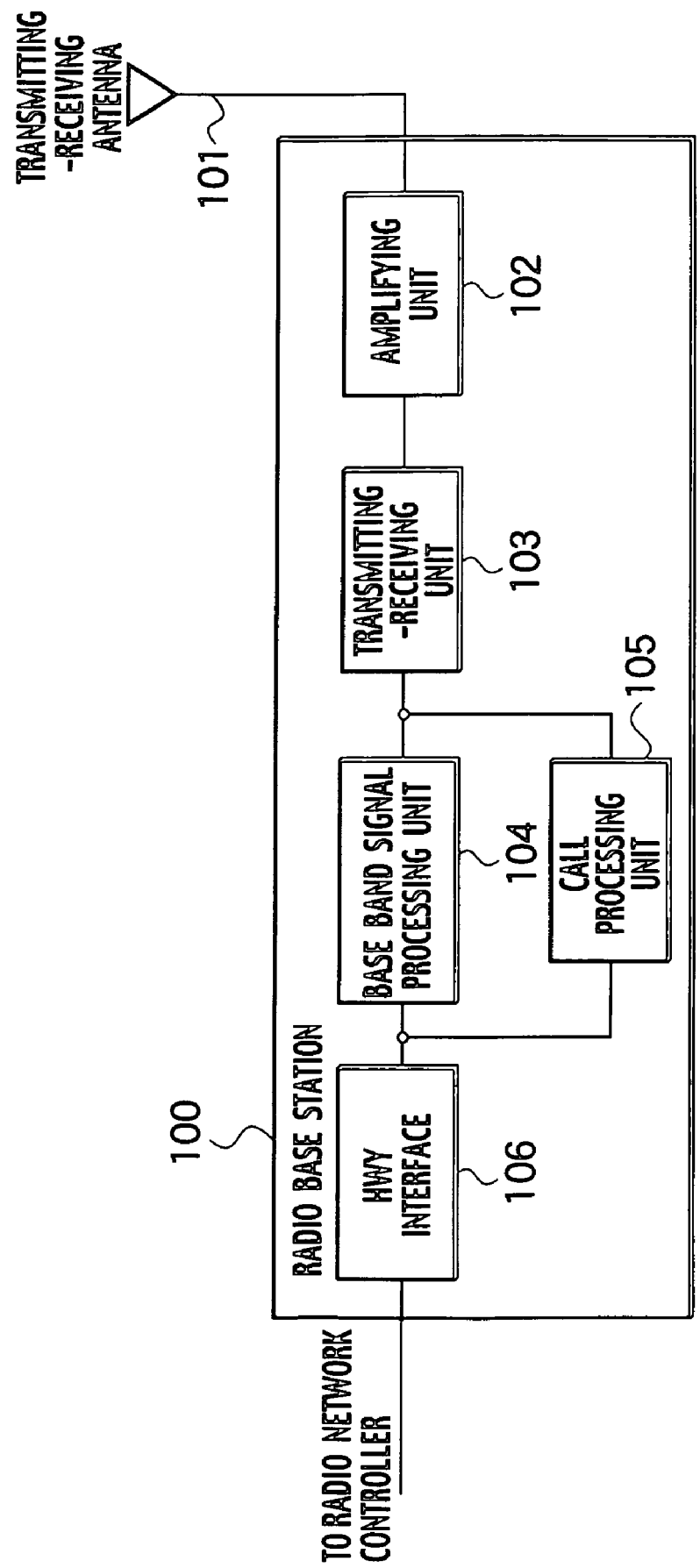
FIG. 4 is a functional block diagram of a radio base station according to the first embodiment of the present invention.

FIG. 4 is a functional block diagram showing an example of the configuration of the radio base station 100 shown in FIG. 3. In FIG. 4, the radio base station 100 includes a transmitting-receiving antenna 101, an amplifying unit 102, a transmitting-receiving unit 103, a base band signal processing unit 104, a call processing unit 105, and an HWY interface 106.

The transmit-receive antenna 101 is configured to transmit a downlink radio frequency signal containing the downlink shared channel, downlink associated dedicated physical channels #1 to #3, and the like, to the respective mobile stations #1 to #3. The transmit-receive antenna 101 is also configured to receive an uplink radio frequency signal containing the downlink associated dedicated physical channels #1 to #3 and the like, from the respective mobile stations #1 to #3.

The amplifying unit 102 is configured to amplify the downlink radio frequency signal outputted from the base band signal processing unit 104, and to transmit the amplified signal to the transmit-receive antenna 101.

The amplifying unit 102 is also configured to amplify the uplink radio frequency signal from the transmit-receive antenna 101, and to transmit the amplified signal to the base band signal processing unit 104.

The transmitting-receiving unit 103 is configured to transmit a base band signal to the base band signal processing unit 104. The base band signal is obtained by converting the frequency of the uplink radio frequency signal outputted from the amplifying unit 102.

The transmitting-receiving unit 103 is configured to transmit the downlink radio frequency signal to the amplifying unit 102. The downlink radio frequency signal is obtained by converting the frequency of the base band signal, outputted from the base band signal processing unit 104, into a radio frequency band.

The base band signal processing unit 104 is configured to provide downlink packets, outputted from the HWY interface 106, with retransmission control (HARQ (Hybrid ARQ)) processing, scheduling processing, transmission format and resource selecting processing, error-correction coding processing, spreading processing and the like, and then transfers the packets to the transmitting and receiving unit 103.

The base band signal processing unit 104 is also configured to provide the base band signal, outputted from the transmitting-receiving unit 103, with despreading processing, RAKE combining processing, error-correction decoding processing, and the like, and transfers the signal to the HWY interface 106.

Figure 5:
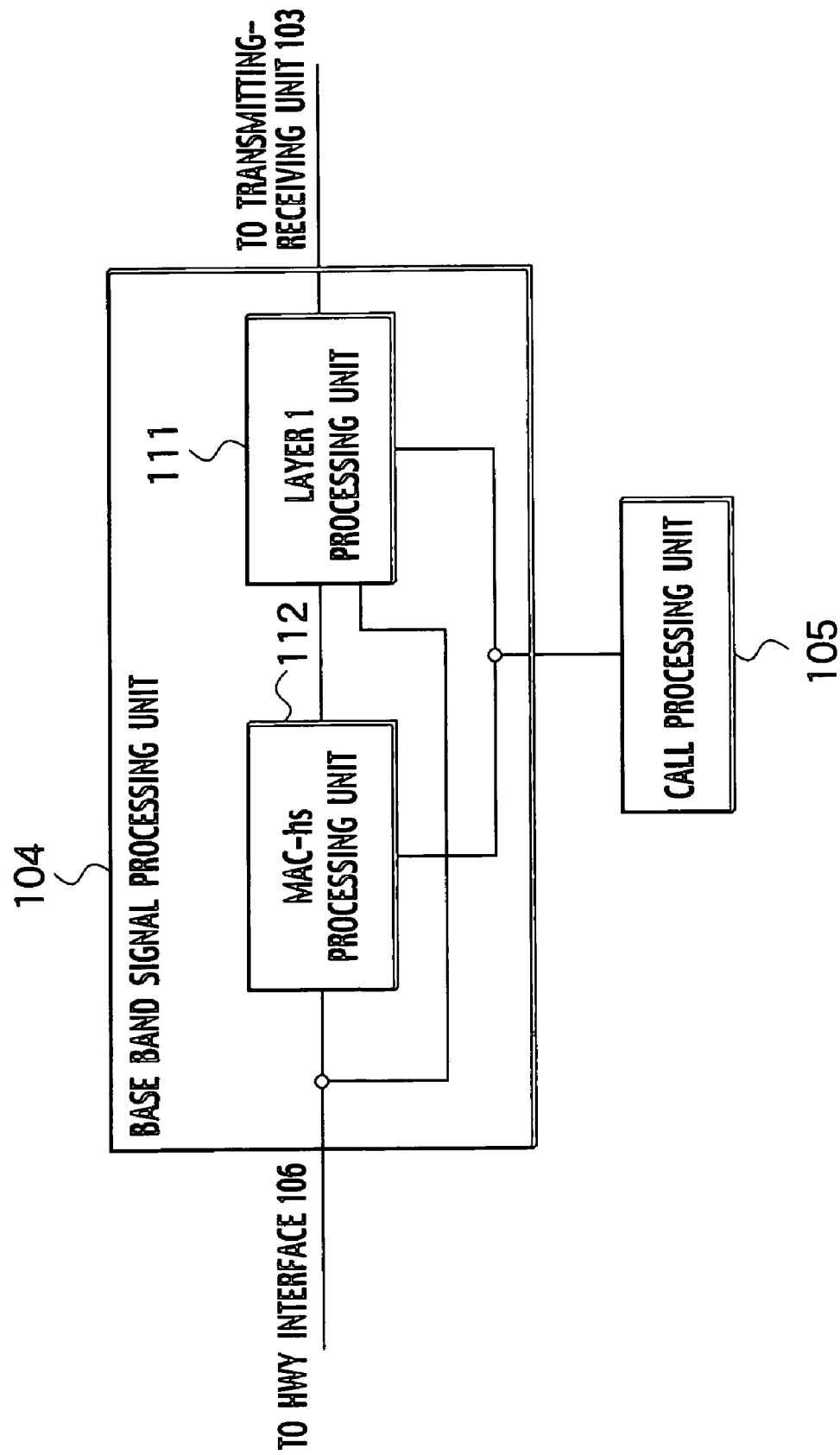
FIG. 5 is a functional block diagram of a base band signal processing unit in the radio base station according to the first embodiment of the present invention.

FIG. 5 shows the functional configuration of the baseband signal processing unit 104. Specifically, as shown in FIG. 5, the base band signal processing unit 104 includes a layer 1 processing unit 111 and an MAC-hs (Medium Access Control-HSDPA) processing unit 112. Both of the layer 1 processing unit 111 and the MAC-hs processing unit 112 are connected to the call processing unit 105.

The layer 1 processing unit 111 is configured to provide the downlink packets with error-correction coding processing and spreading processing, to provide the uplink packets with despreading processing, error-correction decoding process and RAKE combining processing, and to provide the associated dedicated physical channels in both directions with transmission power control processing.

Further, the layer 1 processing unit 111 is configured to receive information indicating a downlink radio quality. This information is reported, being carried on a control bit field specifically for an uplink dedicated physical channel from each mobile station. The layer 1 processing unit 111 then outputs the information to an evaluation function calculating unit 180 of the MAC-hs processing unit 112.

Here, the information indicating the radio quality include, for example, instantaneous receipt SIR (signal-to-interference ratio), BLER (Bit Error Rate), CQI (Channel Quality Indicator) and the like.

The MAC-hs processing unit 112 is configured to provide retransmission control (HARQ) processing of the downlink shared channel in HSDPA, scheduling processing for packets waiting for transmission, and transmission format and resource selection processing.

Figure 6:
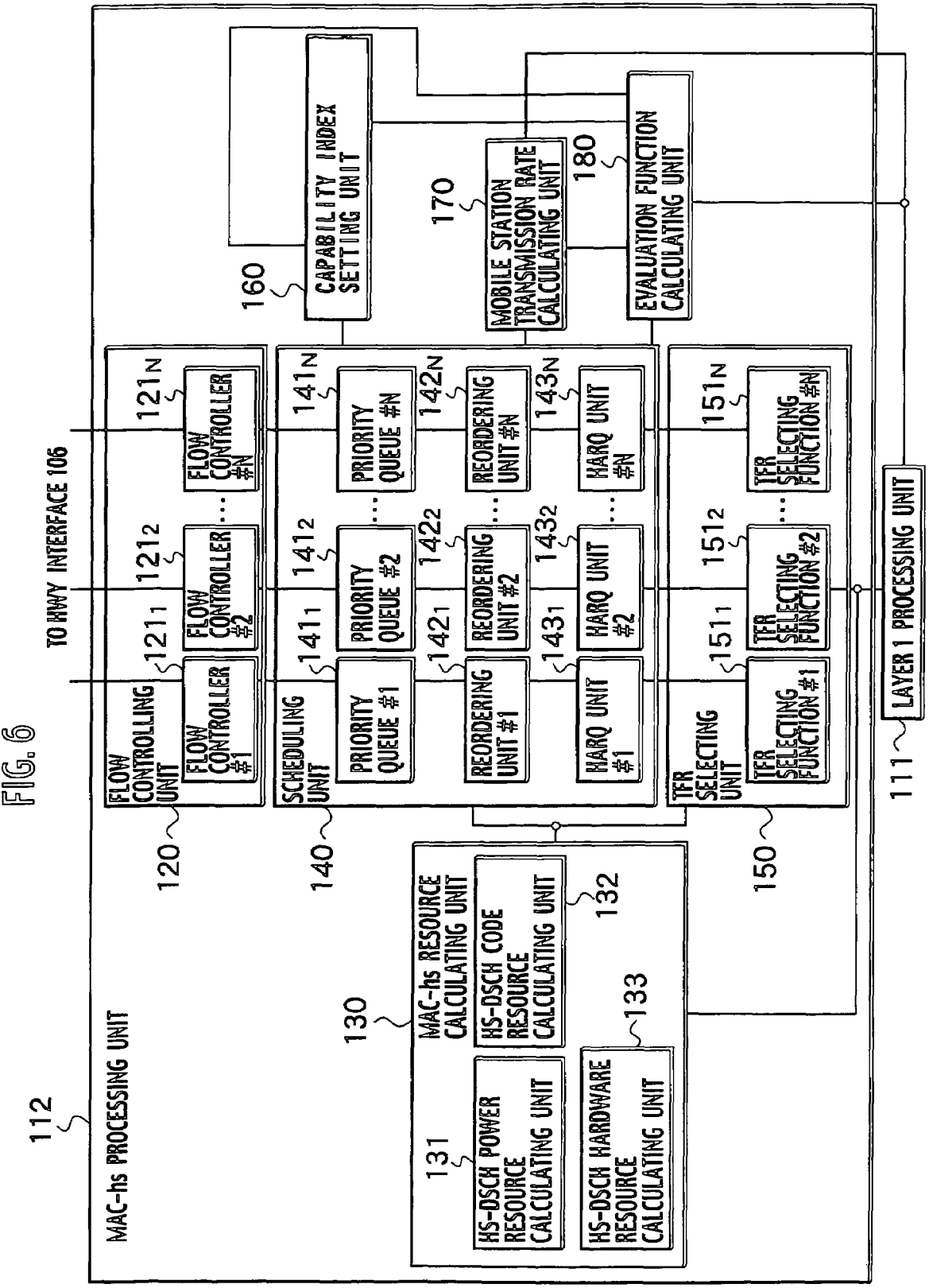
FIG. 6 is a functional block diagram of an MAC-hs processing unit within the base band signal processing unit in the radio base station according to the first embodiment of the present invention.

FIG. 6 shows the functional configuration of the MAC-hs processing unit 112. As shown in FIG. 6, the MAC-hs processing unit 112 includes a flow controlling unit 120, an MAC-hs resource calculating unit 130, a scheduling unit 140, a TFR (transmission format and resource) selecting unit 150, a capability index setting unit 160, a mobile station transmission rate calculating unit 170, and the evaluation function calculating unit 180.

The flow controlling unit 120 includes a plurality of flow controllers (#1 to #N) $121_1$ to $121_N$, and has a function of adjusting a transmission rate of downlink packets, which has been received from a radio network controller through the HWY interface 106, based upon a capacity of an implemented transmission queue (buffer) and the like.

The respective flow controllers (#1 to #N) $121_1$ to $121_N$ monitor the flow of downlink packets. Once the flow of downlink packets increases, and the free space in the transmission queue (buffer) is reduced, the flow controllers $121_1$ to $121_N$ perform processing for suppressing the volume of packets to be transmitted.

Note that the flow controllers (#1 to #N) $121_1$ to $121_N$ correspond to connections #1 to #N between the radio base station and the mobile stations #1 to #N, respectively.

The MAC-hs resource calculating unit 130 is configured to calculate radio resources (a power resource, a code resource, a hardware resource and the like) to be assigned to HS-DSCH, and to include an HS-DSCH power resource calculating unit 131 which calculates the power resource, an HS-DSCH code resource calculating unit 132 which calculates the code resource, and an HS-DSCH hardware resource calculating unit 133 which calculates the hardware resource.

The scheduling unit 140 is configured to provide downlink packets to be transmitted to each mobile station, with scheduling processing.

As described later, in the first embodiment, the scheduling unit 140 is configured to schedule packets to the respective mobile stations based upon capabilities of the respective mobile stations.

The scheduling unit 140 may be configured to schedule to transmit packets to a mobile station which maximizes a value of an evaluation function calculated in use of capability indexes corresponding to the capabilities of the mobile stations.

As described later, the scheduling unit 140 provides scheduling processing for downlink packets to be transmitted to each mobile station, based upon the value of the evaluation function related to the respective mobile station. The value of the evaluation function is calculated by the evaluation function calculating unit 180.

Specifically, the scheduling unit 140 selects a mobile station #n maximizing the value $C_n$ of the evaluation function amongst the respective mobile stations. Thereafter, the scheduling unit 140 assigns a priority queue 141 to the mobile station #n (that is, the scheduling unit 140 carries out assignment of downlink transmission).

As shown in FIG. 6, the scheduling unit 140 has N priority queues (#1 to #N) $141_1$ to $141_N$, N reordering units (#1 to #N) $142_1$ to $142_N$, and N HARQ units (#1 to #N) $143_1$ to $143_N$.

The priority queues (#1 to #N) $141_1$ to $141_N$, the reordering units (#1 to #N) $142_1$ to $142_N$, and the HARQ units (#1 to #N) $143_1$ to $143_N$ correspond to connections #1 to #N between the radio base station and the mobile stations #1 to #N, respectively.

The priority queues (#1 to #N) $141_1$ to $141_N$ are transmission queues provided in the connections, respectively. In other words, the priority queues (#1 to #N) $141_1$ to $141_N$ are configured to accumulate downlink packets until they are selected by the scheduling processing.

Normally, one priority queue is used for one mobile station. However, a plurality of priority queues are used for one mobile station when a plurality of connections are set in one mobile station.

The reordering units (#1 to #N) $142_1$ to $142_N$ are configured to give sequence numbers to downlink packets so that the mobile station #n can execute receiving order control processing for the downlink packets in the retransmission control processing using HARQ. The reordering units (#1 to #N) $142_1$ to $142_N$ also perform window control processing to prevent a reception buffer overflow in the mobile station #n.

The HARQ units (#1 to #N) $143_1$ to $143_N$ are configured to perform the retransmission control processing by using a stop-and-wait protocol ARQ of M process, based upon ACK/NACK feedback in the uplink direction.

An example of the operation of the stop-and-wait protocol ARQ performed in the HARQ units (#1 to #N) $143_1$ to $143_N$ is described with reference to FIG. 7.

Figure 7:
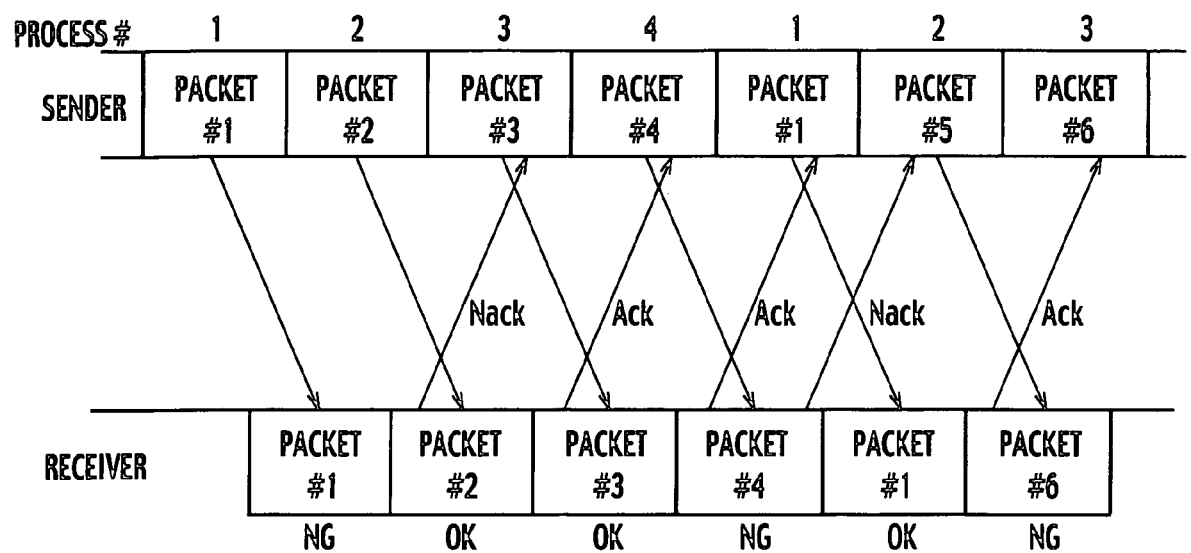
FIG. 7 is a view for explaining an operation of an HARQ unit of the MAC-hs processing unit within the base band signal processing unit in the radio base station according to the first embodiment of the present invention.

As shown in FIG. 7, in the stop-and-wait protocol ARQ, a receiver receives packets from a sender and then returns transmission acknowledgements (ACK/NACK) to the sender.

In the example of FIG. 7, the receiver could not receive a packet #1 correctly and thus returns a negative acknowledgement (NACK) to the sender. Meanwhile, the receiver could receive a packet #2 correctly, and thus returns an positive acknowledgement (ACK) to the sender. The receiver repeats the operation of returning ACK or NACK to the sender in the order of received packets.

The TFR selecting unit 150 includes N TFR selecting functions (#1 to #N) $151_1$ to $151_N$. The TFR selecting functions (#1 to #N) $151_1$ to $151_N$ correspond to the connections #1 to #N between the radio base station and the mobile stations #1 to #N, respectively.

The TFR selecting functions (#1 to #N) $151_1$ to $151_N$ are configured to decide a downlink transmission format (a number of codes, a modulation scheme, a coding rate and the like) and radio resources which are used in the respective connections #1 to #N, based upon the CQI which is an indicator of the downlink quality received through an uplink channel, the radio resources (a power resource, a code resource, a hardware resource) to be assigned to HS-DSCH which are calculated in the MAC-hs resource calculating unit 130, and the like.

The respective TFR selecting functions (#1 to #N) $151_1$ to $151_N$ notify the layer 1 processing unit 111 of the decided downlink transmission format and radio resources.

The capability index setting unit 160 is configured to set capability indexes $B_n$ corresponding to each of the capabilities of the mobile stations #n.

Here, the capability index $B_n$ of the mobile station #n is set in accordance with a parameter in a "UE Capability Category" designated in 3GPP TS25.306, whether or not the Advanced Receiver is provided at the mobile station #n, whether or not the Receive diversity function is provided at the mobile station #n, whether or not the mobile station #n can perform the transmission diversity or the like.

Here, the Advanced Receiver designates an equalizer, interference canceller, G-RAKE or the like.

Further, a parameter in the "UE Capability Category" may include a modulation scheme of data which the mobile station can receive (e.g. "16QAM and QPSK", "QPSK only" or the like), a maximum number of codes used for data which the mobile station can receive (a maximum number of HS-DSCH codes received), a maximum size of data which the mobile station can receive (a maximum number of bits of HS-DSCH transport block received within an HS-DSCH TTI), an amount of a memory buffer in a receiver for Turbo decoding (a total number of soft channel bits), a minimum interval to be ready for receiving a packet after a packet is received at the mobile station (Maximum TTI interval).

Further, the capability index setting unit 160 may be configured to set the capability indexes $B_n$ corresponding to the capabilities of the mobile stations #n, in accordance with an external instruction.

Concretely, the capability index setting unit 160 may be configured to set the capability indexes $B_n$ corresponding to the capabilities of the mobile stations #n which is informed by a signaling from an upper node of the base station 100, or to set the capability indexes $B_n$ corresponding to the capabilities of the mobile stations #n which is directly informed from the mobile station #n itself.

Further, the capability index setting unit 160 may be configured to obtain the capabilities of the mobile stations #n from an ID or terminal information of the mobile station #n.

The mobile station transmission rate calculating unit 180 is configured to calculate an average transmission rate of downlink packets to the mobile station #n, according to the following equation.

$$\overline{Rn}(t) = \delta \cdot \overline{Rn}(t-1) + (1-\delta) \cdot Rn \quad (1)$$

Where $\delta$ is a predetermined parameter which designates a section where averaging processing is performed, and also indicates a forgetting factor ($0 \leq \delta \leq 1$) for the averaging processing. By controlling $\delta$, the level of fairness provided by the scheduler can be controlled.

For example, when the value of $\delta$ is set at "0.9999", the section where the average transmission rate of packets to each mobile station are calculated becomes larger than a section obtained when the value of $\delta$ is set at "0.99". As a result, fairness amongst the mobile stations over a long period of time is taken into consideration, thus operating the scheduler with high fairness in terms of time.

Conversely, if the section where the average transmission rate of packets to each mobile station is reduced, in other words, if the value of $\delta$ is reduced, fairness amongst the mobile stations in a short period of time is taken into consideration. Hence, it becomes possible to operate the scheduler with low fairness in terms of time.

This parameter $\delta$ can be set for downlink packets within the priority queues $141_1$ to $141_N$, based upon the service types, the contract types, the terminal types (e.g. types based on the above-described capability index $B_n$), the cell types, the priority classes and the like.

In the above (Equation 1), $R_n$ represents an instantaneous transmission rate of packets to a mobile station #n.

The instantaneous transmission rate $R_n$ of packets to the mobile station #n is any one of the following: a size (data size) of packets, the delivery acknowledgment of which from the mobile station #n has been received; a size (data size) of packets transmitted to the mobile station #n; and a size (data size) of transmittable packets calculated (estimated) based upon the radio quality between the radio base station and the mobile station #n, which is reported from the mobile station #n.

Here, "a size of transmittable packets estimated" indicates a size of packets which are estimated to be transmitted within a predetermined error rate, in accordance with a CQI for indicating a downlink radio quality, an instantaneous SIR of a downlink transmission channel, a radio resource to be assigned to an HS-DSCH which is calculated by the MAC-hs resource calculating unit 130, and the like.

The mobile station transmission rate calculating unit 170 is configured to renew the average transmission rate of packets at each predetermined transmission time interval or at each time interval at which the value of the evaluation function used for scheduling of packets is calculated.

The mobile station transmission rate calculating unit 170 is also configured to calculate the instantaneous transmission rate $R_n$ of the packets, which is used for renewal of the average transmission rate of the packets, by using a predetermined calculation method.

For example, the mobile station transmission rate calculating unit 170 is configured to renew the average transmission rate of packets in the patterns of the types #1 to #5 as shown in FIG. 8.

In the pattern of the type #1, the mobile station transmission rate calculating unit 170 renews the average transmission rate of packets, by calculating the size of packets, the delivery acknowledgement of which from the mobile station #n has been received, at every TTI (transmission time interval).

In the pattern of the type #2, the mobile station transmission rate calculating unit 170 renews the average transmission rate of packets, by calculating the sizes of packets transmitted to the mobile station #n, at every TTI.

In the pattern of type #3, the mobile station transmission rate calculating unit 170 renews the average transmission rate of packets, by calculating the size of transmittable packets calculated (estimated) based upon the radio quality $R_n$ between the radio base station and the mobile station #n, which is reported from the mobile station #n, at every TTI.

In the pattern of type #4, the mobile station transmission rate calculating unit 170 renews the average transmission rate of packets, by calculating the size of packets, the delivery acknowledgement of which from the mobile station #n has been received. The size of the packets is calculated at each time interval at which the value of the evaluation function used for scheduling of packets is calculated.

In the pattern of type #5, the mobile station transmission rate calculating unit 170 renews the average transmission rate of packets, by calculating the size of packets transmitted to the mobile station #n. The size of the packets is calculated at each time interval at which the value of the evaluation function used for scheduling of packets is calculated.

The mobile station transmission rate calculating unit 170 may also be configured to obtain the instantaneous transmission rate $R_n$ of packets to the mobile station #n, by a method apart from the above.

For example, after the mobile station #n starts communicating, the mobile station transmission rate calculating unit 170 can measure the data size in a data link layer, in each predetermined period, so as to obtain the instantaneous transmission rate $R_n$ of packets to the mobile station #n. Then, the packets are addressed to the mobile station #n, and the packets are flown into the MAC-hs processing unit 112.

In such a case, the MAC-hs processing unit 112 is required to have a function of measuring the transmission rate of the packets in the data link layer.

The evaluation function calculating unit 180 is configured to calculate the value $C_n$ of the evaluation function used in the scheduling processing performed by the scheduling unit 140.

The call processing unit 105 is configured to transmit and receive call processing signals to/from the radio network controller located in the upper position of the radio base station 100.

The call processing unit 105 is also configured to manage the condition of the radio base station 100, and to assign the radio resources to the radio base station 100.

The HWY interface 106 is configured to serve as an interface between the radio network controller and the radio base station 100.

The HWY interface 106 is configured to transfer downlink packets received from the radio network controller to the base band signal processing unit 104, and to transfer uplink packets received from the base band signal processing unit 104 to the radio network controller.

<Operation of Packet Transmission Control Apparatus According to the First Embodiment>

Described with reference to FIG. 9 is the operation of the packet transmission control apparatus according to the first embodiment, more specifically, the operation of the scheduling processing for downlink packets in the MAC-hs processing unit 112.

As shown in FIG. 9, in step S2001, the evaluation function calculating unit 180 sets initial values for calculation of the value of the evaluation function related to each mobile station #n.

Specifically, the evaluation function calculating unit 180 sets "n=1", "$C_{max}$=0", and "$n_{max}$=0" as the initial values. Here, "n" represents a subscript of the mobile station, "$C_{max}$" represents a maximum value of the evaluation function, and "$n_{max}$" represents a subscript of a mobile station maximizing the value of the evaluation function.

In step S2002, the evaluation function calculating unit 180 acquires instantaneous transmission rates $R_n$ in the downlinks between the radio base station and the respective mobile stations #n from the layer 1 processing unit 111.

In step S2003, the evaluation function calculating unit 180 acquires, from the mobile station transmission rate calculating unit 170, average transmission rates $\overline{Rn}$ of downlink packets to the respective mobile stations #n.

In step S2004, the evaluation function calculating unit 180 acquires, from the capability index setting unit 160, capability indexes $B_n$ of the respective mobile stations #n.

In step S2005, the evaluation function calculating unit 180 determines whether all information in the steps S2002 to S2004 is acquired.

Where it is determined that all information is acquired (where the answer is "YES" in the step S2005), this operation proceeds to step S2006. Otherwise (where the answer is "NO" in the step S2005), the evaluation function calculating unit 180 attempts to acquire information which has not been acquired.

In step S2006, the evaluation function calculating unit 180 receives "index parameters α and β", designated remotely, through the call processing unit 105, and then calculates the value $C_n$ of the evaluation function according to the following equation in step S2007.

$$Cn = Bn \cdot \frac{Rn^\alpha}{\overline{Rn}^\beta} \qquad (2)$$

Once the value $C_n$ of the evaluation function is calculated as described above, the evaluation function calculating unit 180 determines whether or not the calculated value $C_n$ of the evaluation function is the maximum value in step S2008.

Currently, "$C_{max}$=0 (the initial value)". Thus, in step S2009, the evaluation function calculating unit 180 sets the value $C_n$ of the evaluation function, measured in the step S2007, as $C_{max}$, and sets the subscript "n" of the mobile station #n corresponding to $C_{max}$, as $n_{max}$.

In step S2010, the evaluation function calculating unit 180 increments the value of "n" by "+1", in order to calculate the value $C_{n+1}$ of the evaluation function of the next mobile station #n+1.

In step S2011, the evaluation function calculating unit 180 determines whether or not the value of "n" exceeds the number "N" of the mobile stations which are communicating with the radio base station 100.

Where it is determined in the step S2011 that the value of "n" does not exceed the number "N" of the mobile stations (where the answer is "NO" in the step S2011), the loop processing from the steps S2002 to S2010 is repeatedly carried out in this operation until it is determined that the value of "n" exceeds the number "N" of the mobile stations.

As a result, the evaluation function calculating unit 180 can calculate the values $C_n$ of the evaluation function with respect to all the mobile stations communicating with the radio mobile station 100.

On the other hand, where it is determined in the step 2011 that the value of "n" exceed the number "N" of the mobile stations (where the answer is "YES" in the step S2011), the evaluation function calculating unit 170 instructs the scheduling unit 140 to assign a transmission queue to the mobile station #$n_{max}$ which corresponds to $n_{max}$ set in the step S2009.

<Operational Effect of Packet Transmission Control Apparatus According to the First Embodiment>

According to the packet transmission control apparatus of the first embodiment, the scheduling unit 140 controls the scheduling of packets to the respective mobile stations #n based upon the capabilities of the respective mobile stations #n regardless of the range of changes in the radio quality $R_n$. Thus, fairness in terms of time can be realized over an operation of the conventional "Proportional Fairness Scheduler".

Concretely, according to the packet transmission control apparatus of the first embodiment, in the above described (Equation 2), a capability index $B_n$ corresponding to the capability of mobile station #n is multiplied to $$Cn = \frac{Rn^\alpha}{Rn^\beta}$$

which is typically used in the evaluation function of the "Proposal Fairness Scheduler". Therefore, scheduling in accordance with the capabilities of the respective mobile stations can be provided in addition to fairness provided by the "Proportional Fairness Scheduler".

In an example case, two mobile stations A1 and A2 exist. The mobile station A1 includes the Receive diversity function and the mobile station A2 does not includes the Receive n diversity function. In this case, according to the packet transmission control apparatus of the first embodiment, the capability index "$B_{A1}$" of the mobile station A1 is set to "2.0" and the capability index "$B_{A2}$" of the mobile station A2 is set to "1.0". Therefore, it can be controlled so that the value "$C_{A1}$" of the evaluation function of the mobile station A1 becomes larger comparing to the value "$C_{A2}$" of the evaluation function of the mobile station A2.

Further, in another example case, two mobile stations A1 and A2 exist. The capability of the mobile station A1 is "the receivable maximum number of codes: 10" and the capability of the mobile station A2 is "the receivable maximum number of codes: 5". In this case, according to the packet transmission control apparatus of the first embodiment, the capability index "$B_{A1}$" of the mobile station A1 is set to "3.0" and the capability index "$B_{A2}$" of the mobile station A2 is set to "1.0". Therefore, it can be controlled so that the value "$C_{A1}$" of the evaluation function of the mobile station A1 become larger comparing to the value "$C_{A2}$" of the evaluation function of the mobile station A2.

Further, in another example case, two mobile stations A1 and A2 exist. The mobile station A1 includes a Receive diversity function and the mobile station A2 includes an equalizer. In this case, according to the packet transmission control apparatus of the first embodiment, the capability index "$B_{A1}$" of the mobile station A1 is set to "2.0" and the capability index "$B_{A2}$" of the mobile station A2 is set to "1.5". Therefore, the evaluation function provided with priorities in accordance with the capability of the mobile station can be used in the scheduling process.

(Modification 1)

The packet transmission control apparatus according to the first embodiment can provide a scheduler which can provide equalization in the scheduling opportunities by setting predetermined parameters α,β appropriately. The scheduler is, for example, the "Proportional Fairness Scheduler (α=1, β=2)", the "MAX C/I Scheduler (α=1, β~1 (but β≠0))", or the scheduler which is intermediate in features between the "Proportional Fairness Scheduler" and the "MAX C/I Scheduler".

The packet transmission control apparatus according to the first embodiment may be configured to use a scheduler other than the above described scheduler. For example, when a scheduler, whose evaluation function $C_n$ is $$Cn = \frac{Rn^\beta}{Rn^\alpha} \cdot Wn^\gamma$$

is used, the packet transmission control apparatus according to the first embodiment can change the evaluation function $C_n$ to $$Cn = Bn \cdot \frac{Rn^\beta}{Rn^\alpha} \cdot Wn^\gamma$$

so that equalization in the scheduling opportunities can be provided, in addition to the functions of conventional schedulers. Here, α,β and γ parameters which takes a value within 0 to 1, and $W_n$ indicates residence time of packet at the radio base station 100.

In the first embodiment, one mobile station uses one priority queue. However, one mobile station may use a plurality of priority queues (for example, K pieces of priority queues). In this case, the packet transmission control apparatus according to the first embodiment performs scheduling for N×K pieces of priority queues, not N pieces of priority queues.

Further, the evaluation function calculating unit 180 in MAC-hs processing unit 112 is configured to include, for example, a program device which can update programs such as CPU, digital signal processor (DSP), or EPCG. The evaluation function calculating unit 180 stores a program for calculating the value $C_n$ of the evaluation function in a predetermined memory. Also, the evaluation function calculating unit 180 may update by downloading predetermined parameters (α, β, δ, γ).

Here, the evaluation function calculating unit 180 may download the predetermined parameters (α, β, δ, γ) from the upper node of the radio base station 100, or may include a terminal I/F to read the predetermined parameters ($\alpha$, $\beta$, $\delta$, $\gamma$) directly from the terminal.

Furthermore, each functional block in the MAC-Hs processing unit 112 may be divided by hardware, or may be divided by software in programs of a processor.

(A Second Embodiment of the Present Invention)

<Packet Transmission Control Apparatus According to the Second Embodiment of the Present Invention>

A packet transmission control apparatus according to the second embodiment of the present invention is described focusing on different points from the packet transmission control apparatus according to the aforementioned first embodiment.

As proposed in, for example, Japanese Patent Laid-Open Publication No. H3-58646, in packet transmission in a packet communication network, it is generally considered that two kinds of priority classes are provided and packets with the first priority are transmitted preferentially over packets with the second priority.

In the second embodiment, the scheduling unit 140 is configured to manage priority classes $PC_n$ related to transmission of packets, for each mobile station #n, and to perform scheduling of packets in accordance with the priority classes $PC_n$.

An operation of the packet transmission control apparatus according to the second embodiment is described below with reference to FIG. 10.

Figure 10:
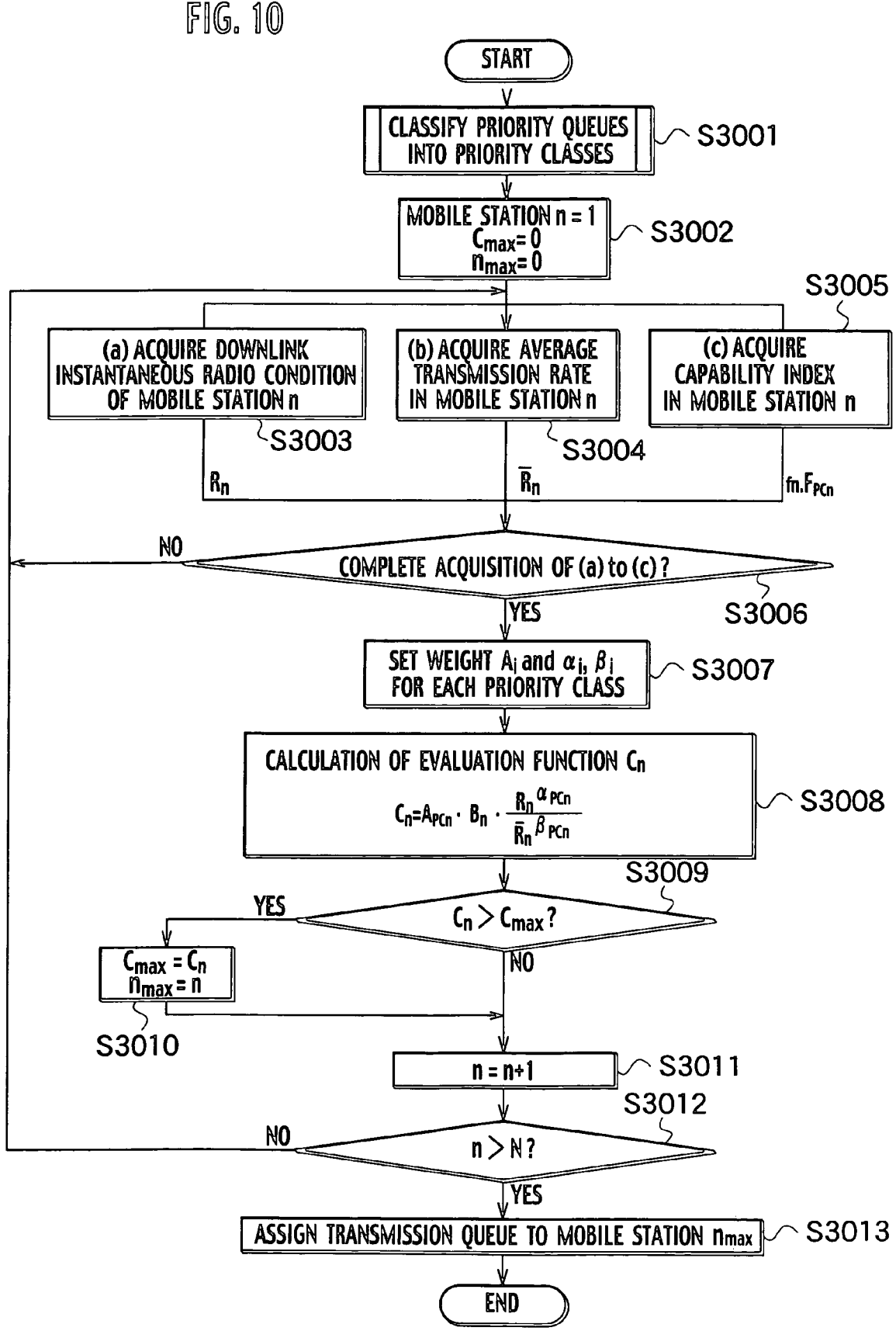
FIG. 10 is a flowchart showing an operation of an MAC-hs processing unit within a base band signal processing unit in a radio base station according to a second embodiment of the present invention

As shown in FIG. 10, in step S3001, the evaluation function calculating unit 180 of the MAC-hs processing unit 112 classifies the priority queues (#1 to #N) 141$_1$ to 141$_N$ into several priority classes.

The operations from steps S3002 to S3006 is the same as those of the steps S2001 to S2005 shown in FIG. 9.

In step S3006, the evaluation function calculating unit 180 acquires all of Rn, $\overline{Rn}$, Bn required in calculating the value $C_n$ of the evaluation function of the mobile station #n.

Thereafter, in step S3007, the evaluation function calculating unit 180 receives predetermined parameters ($\alpha_i$, $\beta_i$), designated remotely, through the call processing unit 105, and a weighting factor (weight) $A_i$ (where "i" represents a subscript of the priority class of the mobile station #n) set for each priority class. Here, the predetermined parameters ($\alpha_i$, $\beta_i$) and the weighting factor (weight) $A_i$ may be set so that the same values are used in each priority class.

In step 3008, the evaluation function calculating unit 180 calculates the value $C_n$ of the evaluation function based upon the following equation.

$$Cn = A_{PC_n} \cdot Bn \cdot \frac{Rn^{\alpha PC_n}}{\overline{Rn}^{\beta PC_n}} \quad (3)$$

Here, "$PC_n$" represents the priority class of the mobile station #n.

Once the value $C_n$ of the evaluation function is calculated as described above, the evaluation function calculating unit 180 determines whether or not the calculated value $C_n$ of the evaluation function is a maximum value in step S3009.

Currently, "$C_{max}$=0 (the initial value)". Thus, in step S3010, the evaluation function calculating unit 180 sets the value $C_n$ of the evaluation function, measured in the step S3008, as $C_{max}$, and sets the subscript "n" of the mobile station #n corresponding to $C_{max}$, as $n_{max}$.

In step S3011, the evaluation function calculating unit 180 increments the value of "n" by "+1", in order to calculate the value $C_{n+1}$ of the evaluation function of the next mobile station #n+1.

In step S3012, the evaluation function calculating unit 180 determines whether or not the value of "n" exceeds the number "N" of the mobile stations communicating with the radio base station 100.

Where it is determined that the value of "n" does not exceed the number "N" of the mobile stations in the step S3012 (where the answer is "NO" in the step S3012), loop processing from the steps S3003 to S3011 is repeatedly carried out in this operation until it is determined that the value of "n" exceeds the number "N" of the mobile stations.

As a result, the evaluation function calculating unit 180 can calculate the values $C_n$ of the evaluation function of all mobile stations communicating with the radio base station 100.

Meanwhile, where it is determined that the value of "n" exceeds the number "N" of the mobile stations (where the answer is "YES" in the step S3012), the evaluation function calculating unit 180 instructs the scheduling unit 140 to assign a transmission queue to the mobile station #$n_{max}$ which corresponds to $n_{max}$ set in the step 3010.

The packet transmission control apparatus according to the second embodiment controls the weighting factor $A_i$ and index parameters $\alpha_i$ and $\beta_i$, in accordance with the priority classes $PC_n$. Therefore, the scheduling opportunity in each priority class can be equalized and the scheduling opportunity among the priority classes can be equalized. Thus, an appropriate scheduler in accordance with the priority classes can be realized.

For example, in (Equation 3), two priority classes are provided. The higher priority class "i" is set as "1" (i=1), and the lower priority class "i" is set as "2" (i=2). In this case, by setting them so that "weighting factor $A_1$>weighting factor $A_2$", packets to the mobile station #n with the higher priority class are transmitted preferentially. In other words, by causing a difference between $A_1$ and $A_2$ to be sufficiently large, the packets with the higher priority class are always transmitted preferentially.

Further, by setting the index parameters "($\alpha 1$, $\beta 2$)=(1, 1)" and "($\alpha 2$, $\beta 2$)=(1, 0)", the packet transmission control apparatus according to the second embodiment can operate as the "Proportional Fairness Scheduler" for packets with the higher priority class and as the "MAX C/I Scheduler" for packets with the lower priority class.

Moreover, by setting the index parameters "($\delta 1$, $\delta 2$)= (0.9999, 0.99)", the packet transmission control apparatus according to the second embodiment can control the priority classes as follows: a large averaging section is set for packets with the higher priority class with more consideration of fairness in terms of time; a small averaging section is set for packets with the lower priority class with less consideration of fairness in terms of time.

In the packet transmission control apparatus according to the second embodiment, the capability indexes $B_n$ can be set in accordance with the capabilities of mobile stations, separately from the above described priority classes.

In an example case, mobile stations #1, #2 and #3 exist. The mobile stations #1 and #2 have the high priority class and the weighting factor is set to "3.0". In contrast, the mobile station #3 has the low priority class and the weighting factor is set to "1.0". The mobile station #1 includes a RAKE receiver and the mobile stations #2 and #3 include equalizers. The capability index $B_1$ of the mobile station #1 is set to "1.0" and the respective capability indexes $B_2$ and $B_3$ of the mobile stations #2 and #3 are set to "2.0". In this case, a scheduling can be provided in consideration of both priority classes and the capabilities of mobile stations.

In other words, in the packet transmission control apparatus according to the second embodiment, scheduling can be provided in consideration of both priority classes and capabilities of the mobile stations, by inserting the capability indexes $B_n$, in accordance with the capabilities of mobile stations, to the evaluation function.

(Modification 2)

Description of the embodiments so far was about the HSDPA which is a high-speed packet transmission system in 3GPP. However, the present invention is not limited to the HSDPA, and can be applied to an arbitrary high-speed packet transmission system which performs transmission control of downlink packets in a mobile communication system.

For example, the present invention can be applied to a high-speed packet transmission system such as the high-speed packet transmission systems in the "cdma2000", the "1x-EV DO" in 3GPP2, the "TDD", and the like.

Additional advantages and modifications will readily occur to those skilled in the art. Therefore, the invention in its broader aspects is not limited to the specific details and the representative embodiment shown and described herein. Accordingly, various modifications may be made without departing from the scope of the general inventive concept as defined by the appended claims and their equivalents.

What is claimed is:

1. A packet transmission control apparatus which performs transmission control of packets to a plurality of mobile stations, comprising:
   an acquirer configured to acquire capability indexes $B_n$ corresponding to capabilities of the mobile stations #n, instantaneous transmission rates $R_n$ of the packets to the mobile stations #n and average transmission rates $\overline{R_n}$ of the packets to the mobile stations #n; and
   a scheduler configured to perform scheduling of the packets in accordance with instantaneous transmission rates $R_n$ of the packets to the mobile stations #n, average transmission rates $\overline{R_n}$ of the packets to the mobile stations #n, and capabilities of the mobile stations #n; and
   wherein the scheduler is configured to schedule to transmit the packets to a mobile station which maximizes a value $C_n$ of an evaluation function which is calculated according to an equation $$Cn = Bn \cdot \frac{Rn^\alpha}{\overline{Rn}^\beta}$$

by using the capability indexes $B_n$ corresponding to capabilities of the mobile stations #n, the instantaneous transmission rates $R_n$ of the packets to the mobile stations #n, the average transmission rates $\overline{R_n}$ of the packets to the mobile stations #n and predetermined parameters α and β.

2. The packet transmission control apparatus according to claim 1,
   wherein the scheduler is further configured to manage priority classes of packet transmission to the mobile stations, and to perform scheduling of the packets to the mobile stations in accordance with the priority classes.

3. The packet transmission control apparatus according to claim 1,
   wherein a capability index setter is configured to set the capability indexes corresponding to the capabilities of the mobile stations in accordance with an external instruction.

4. The packet transmission control apparatus according to claim 1,
   wherein the capability of the mobile station is defined by at least one of whether or not the mobile station has a Receive n diversity function, whether or not the mobile station can perform a transmission diversity, whether or not the mobile station has an equalizer, interference canceller, G-RAKE, a maximum size of data which the mobile station can receive, a modulation scheme of data which the mobile station can receive, a maximum number of codes used for data which the mobile station can receive, and a minimum interval to be ready for receiving a packet after a packet is received at the mobile station.

5. A packet transmission control apparatus, comprising:
   a scheduler configured to perform scheduling of the packets in accordance with instantaneous transmission rates $R_n$ of the packets to the mobile stations #n, average transmission rates $\overline{R_n}$ of the packets to the mobile stations #n, and capabilities of the mobile stations #n; and
   an acquirer configured to acquire the instantaneous transmission rates $R_n$ of the packets to the mobile stations #n and the average transmission rates $\overline{R_n}$ of the packets to the mobile stations #n,
   wherein the scheduler is configured to manage priority classes of packet transmission to the mobile stations, and to perform scheduling of the packets to the mobile stations in accordance with the priority classes, and
   wherein the scheduler is further configured to schedule to transmit the packets to a mobile station which maximizes a value $C_n$ of an evaluation function which is calculated according to an equation $$Cn = A_{PCn} \cdot Bn \cdot \frac{Rn^{\alpha PC_n}}{\overline{Rn}^{\beta PC_n}}$$

by using weighting factors $A_{PCn}$ according to the priority classes $PC_n$ of the mobile stations #n, the capability indexes $B_n$ corresponding to the capabilities of the mobile stations #n, instantaneous transmission rates $R_n$ of the packets to the mobile stations #n, the average transmission rates $\overline{R_n}$ of the packets to the mobile stations #n and predetermined parameters $\alpha_{PCn}$ and $\beta_{PCn}$ for each of the priority classes $PC_n$.

6. A packet transmission control method for performing, on a control apparatus, transmission control of packets to a plurality of mobile stations, the method comprising:
   acquiring, at an evaluation function calculating unit of the control apparatus, capability indexes $B_n$ corresponding to capabilities of the mobile stations #n, instantaneous transmission rates $R_n$ of the packets to the mobile stations #n, and average transmission rates $\overline{R_n}$ of the packets to the mobile stations #n;
   calculating, at the evaluation function calculating unit, values $C_n$ of evaluation functions according to an equation $$Cn = Bn \cdot \frac{Rn^\alpha}{\overline{Rn}^\beta}$$

by using the capability indexes $B_n$ corresponding to the capabilities of the mobile stations #n, the instantaneous transmission rates $R_n$ of the packets to the mobile stations #n, the average transmission rates $\overline{R_n}$ of the packets to the mobile stations #n, and predetermined parameters $\alpha$ and $\beta$; and scheduling, at a scheduler of the control apparatus, the packets to transmit to a mobile station #n which maximizes a value $C_n$ of the calculated evaluation function.

* * * * *